United States Patent [19] [11] Patent Number: 4,553,605
Katayama et al. [45] Date of Patent: Nov. 19, 1985

[54] WORK-VEHICLE WITH ROLLING-CONTROL MECHANISM

[75] Inventors: Yoshiyuki Katayama, Osaka; Tetsuya Nishida, Kawachinagano, both of Japan

[73] Assignee: Kubota, Ltd., Osaka, Japan

[21] Appl. No.: 493,473

[22] Filed: May 11, 1983

[30] Foreign Application Priority Data

Jul. 16, 1982 [JP] Japan .............................. 57-124565

[51] Int. Cl.⁴ ............................................ A01B 63/10
[52] U.S. Cl. ...................................... 172/2; 172/448; 280/446 A; 318/585
[58] Field of Search ......................... 172/2, 4, 4.5, 7, 9, 172/10, 439, 445.1, 445, 443; 280/446 A; 414/699, 700, 701; 364/434, 435; 318/585, 587, 318/561, 611, 648, 649

[56] References Cited

U.S. PATENT DOCUMENTS 3,750,757  8/1973  Saetti ........................................ 172/9
4,019,585  4/1977  Dezelan ................................. 172/4.5
4,276,975  7/1981  Jenkins ............................. 414/700 X
4,393,942  7/1983  Mijot et al. .............................. 172/2

FOREIGN PATENT DOCUMENTS 57-17021  1/1982  Japan .................................. 318/587

Primary Examiner—Richard T. Stouffer
Attorney, Agent, or Firm—Edwin E. Greigg

[57] ABSTRACT

A work vehicle with a rolling-control mechanism, having a ground-engaging implement to be connected via a three-point link mechanism adapted to be free to effect adjustment with respect to the connection positions, has a sensor to detect slanting of the vehicle body. It also has electrical circuitry for correcting the control gain based on the detection results thereof, in response to the adjustment of the implement-attaching width and of the connection positions of three-point link mechanism. It may further be provided with a sensor and a control mechanism for effecting the control to minimize errors as are particular to using, as the rolling-control mechanism, torsional displacement in the three-point link mechanism.

21 Claims, 4 Drawing Figures

WORK-VEHICLE WITH ROLLING-CONTROL MECHANISM

BACKGROUND OF THE INVENTION (1) Field of the Invention

This invention relates to a work vehicle with a rolling-control mechanism, in which on the part of its running body, to which a ground-engaging implement is connected via such three-point mechanism that the connection positions between its lift rods and lower links are free to adjust, there is provided a sensor that detects the body left-and-right slant angle, and which is equipped with the rolling-control mechanism that adjusts the posture, relative to the ground, of the said ground-engaging implement by means of extending and contracting, on the basis of the body slant angle detection results of the sensor, one lift rod in the said three-point link mechanism.

(2) Description of the Prior Art

The work vehicle with the rolling-control mechanism, as is equipped, on the part of the vehicle body, with the left-and-right slant sensor, can effect the rolling control for any ground-engaging implement attached to the three-point link mechanism. The work vehicle thus has the characteristics to the effect that it can be used quite conveniently, without suffering from the inconvenience of effecting, as in the case of older traditional systems in which the sensor is used to be attached to the ground-engaging implement for the rolling control thereof.

However, since this rolling-control mechanism, has been contructed so as to adjust the posture of the implement (slanting tilt in the left-and-right direction) by means of torsional movement of the three-point link mechanism in its entirety by extending and contracting a lift rod on one side, there have occurred some errors in the desired posture (for instance horizontal one) if and when the basic posture of this three-point link mechanism itself alters on account of alteration of the link-connection positions and alteration of the rear-end width of the lower links.

SUMMARY OF THE INVENTION

This invention has as its object to improve the drawbacks of the conventional work vehicle with a rolling-control mechanism, as mentioned above. In order to attain the object, the work vehicle with a rolling-control mechanism, according to this invention, in which on the part of its running body (1), to which a ground-engaging implement (2) is connected via such three-point link mechanism (6) that the connection positions between its lift rods (7), (7') and lower links (4), (4') are free to adjust, there is provided a sensor ($S_1$) that detects directional sense of the body left-and-right slant and slant angle ($\theta$), and which is equipped with the rolling-control mechanism (A) that adjusts the posture, relative to the ground, of the said ground-engaging implement (2) by means of extending and contracting, on the basis of the body slant angle ($\theta$) detection results of the sensor ($S_1$); one lift rod (7') in the said three-point link mechanism (6), is in addition thereto provided with means for shifting over, in response to the adjustment of the implement-attaching width of the lower links (4), (4') a control gain with respect to the slant angle ($\theta$), as has been detected by means of the said sensor ($S_1$), to a different gain.

With the work vehicle with the rolling-control mechanism, according to this invention as mentioned above, the working control gain, with respect to the detected slant angle, is shifted over, if and when the implement-attaching width of the lower links is altered in actually attaching any of the variety of implements, to a proper control gain in conformity with the thusly altered new implement-attaching width. Therefore, the posture-control is effected in excellent precision, even upon altering the implement-attaching width, at the optimum control gain in proper response to such alteration, thus effectively suppressing the control errors as might otherwise occur on account of the characteristics of three-point link mechanisms.

Still further effective suppressing of the control errors on account of the characteristics of three-point link mechanisms may be realized with a further preferred work vehicle with a rolling-control mechanism, which is provided, not only with the means for shifting over the control gain in response to the adjustment of the implement-attaching width of the lower links, as mentioned hereinabove, but also with further means for shifting over the control gain in response to the adjustment of fore-and-aft positions or up-and-down positions in the connection portions between the lift rods and lower links. Yet further advantages of this invention will become clear from the detailed description to follow hereunder as given with reference to the accompanying drawings.

DESCRIPTION OF THE PREFERRED EMBODIMENT

Figure 1:
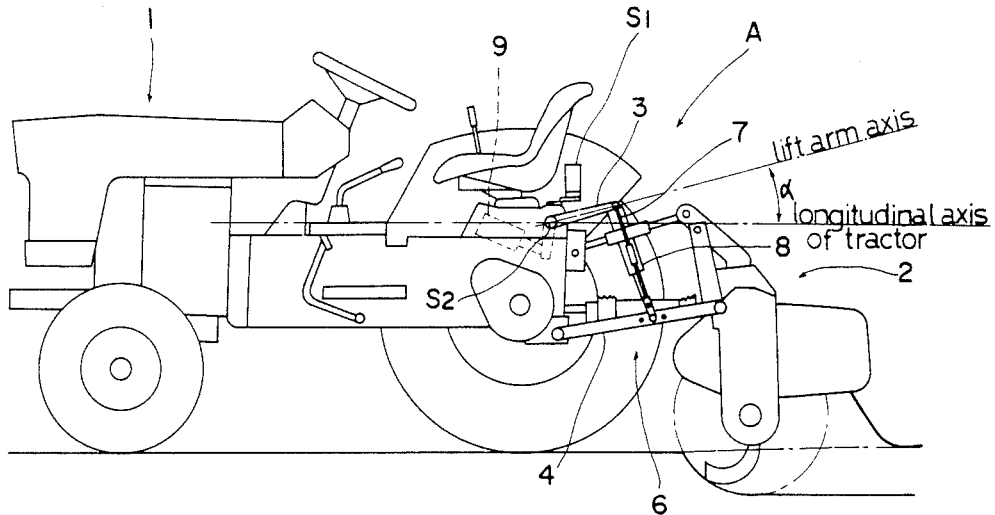
FIG. 1 is an overall side elevation of a work vehicle with a rolling-control mechanis, incorporating an embodiment of this invention.
Figure 2:
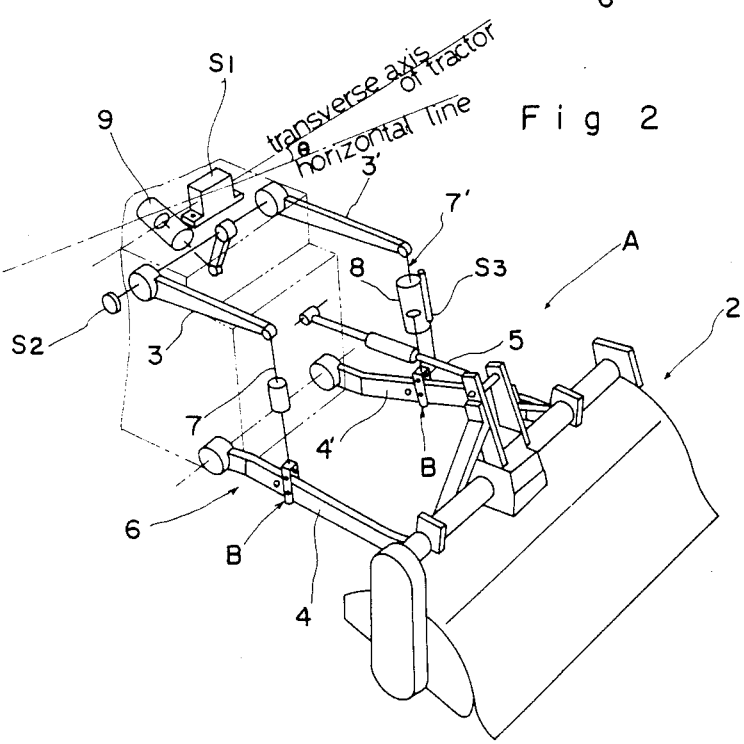
FIG. 2 is a perspective view of its essential portions.

In a work vehicle as shown in FIG. 1, wherein rearwardly of a tractor (1), serving as an example of a running body, there is connected a cultivation rotary (2), serving as an example of a ground-engaging implement, for free driving raising and lowering in a state as to undergo rolling integrally with the said tractor (1), via a three-point link mechanism (6) consisting of a pair of left and right lower links (4), (4'), which are in interlocking connection to a pair of left and right lift arms (3), (3') and a top link (5); there is annexedly provided on the part of the said tractor (1), as shown in FIG. 2, a sensor ($S_1$) which detects the rolling of the said cultivation rotary (2) as will follow the rolling of the said tractor (1), namely the left-and-right slant angle ($\theta$) with respect to the horizon; and there is provided a rolling-control mechanism (A) which automatically corrects, on the basis of the detection by means thereof, the left-and-right posture, with respect to the ground, of the said cultivation rotary (2) so that same may come to the preset posture (horizontal posture), by means of extending and contracting, via an oilhydraulic cylinder (8), one member (7') out of a pair of left and right lift rods (7), (7') which interconnect the said respectively corresponding lower links (4), (4') and lift arms (3), (3').

Figure 3:
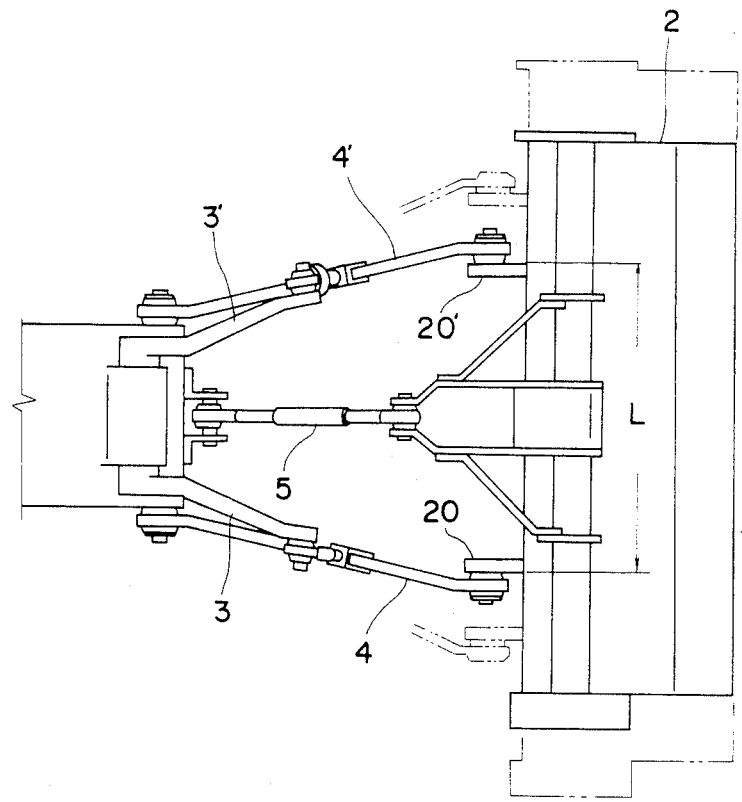
FIG. 3 is a schematic view showing how its lower links and implement are connected.

The said three-point-link mechanism (6) is constructed such that, as shown in FIG. 3, the attaching width (L) of the lower links (4), (4') is alterable in proper accordance with given positions of attaching portions (20), (20') of the ground-engaging implement (2), and the connection positions (B) between the said lift rods (7), (7') and lower links (4), (4') may selectively be moved both in the fore-and-aft direction and in the up-and-down direction, to thus versatilely coping with any apparatus style and the working style of the ground-engaging implement (2).

Here, the said lift arms (3), (3') are constructed such that by raisingly and loweringly driving same by means of an oilhydraulic cylinder (9) it is possible to freely raise and lower the said cultivation rotary (2), serving as the ground-engaging implement, with respect to the tractor (1), and that at a lift-arm fulcrum portion there is provided a sensor ($S_2$) which detects the lift angle ($\beta$) of the said lift arms (3), (3') with respect to the tractor (1).

On the other hand, on the oilhydraulic cylinder (8) which extends and contracts the said lift rod (7'), there is provided a sensor ($S_3$) which detects the extension and contraction amount (l) and which is therefore constructed so as to detect the length displacement of the lift rod (7').

As to the said sensors ($S_1$), ($S_2$), there are used rotary-motion type potentiometers, which are therefore constructed so as to generate voltages ($V_1$), ($V_2$) corresponding to the respective rotary angles ($\theta$), ($\alpha$), and as to the sensor ($S_1$), in particular, there is used such one as is rotatingly maneuvered by means of a weight which is suspended for free left and right rocking.

On the other hand, as to the said sensor ($S_3$), there is utilized a linearly sliding type potentiometer, which is therefore constructed so as to generate a voltage ($V_3$) corresponding to the extension and contraction amount (l) of the said oilhydraulic cylinder (8).

Figure 4:
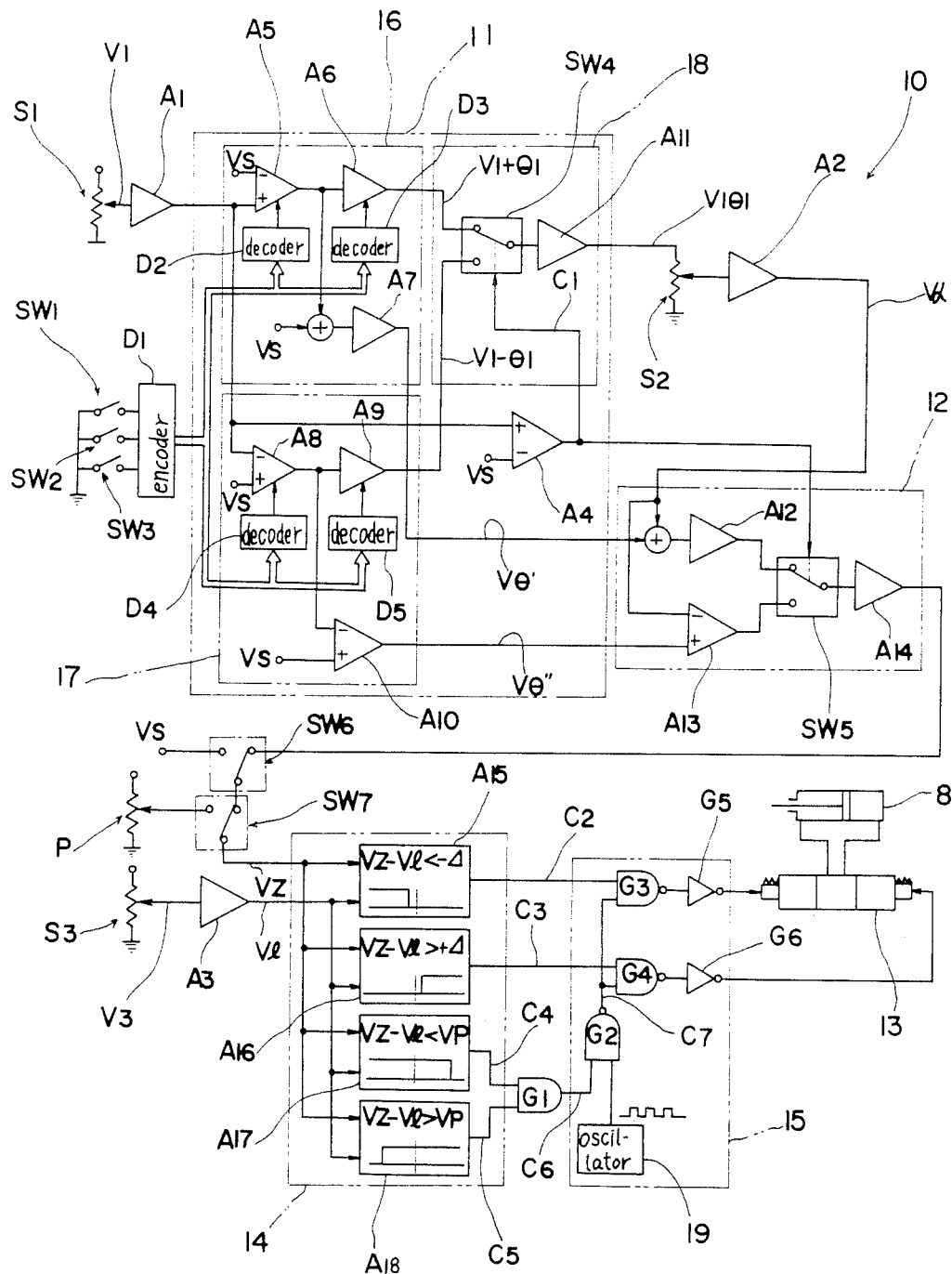
FIG. 4 is a block diagram of its control mechanism.

Description is now given hereunder with reference to FIG. 4, on a control circuit which adjusts, on the basis of the detection voltages ($V_1$), ($V_2$), ($V_3$) of the said sensors ($S_1$), ($S_2$), ($S_3$), the left-and-right slant posture of the said cultivation rotary (2).

As to the control circuit (10), same is basically constructed with: a preamp ($A_1$) which converts the output voltage ($V_1$) of the sensor ($S_1$) to a voltage ($V_\theta$) which directly allows judgment of the magnitude of the displacement amount departing from the basic norm (corresponding to the horizontal state $\theta=0$ of the body slant angle ($\theta$) and its directional sense ($\theta>0$ and $\theta<0$); a gain converter (11) which converts the output voltage ($V_\theta$) of said amplifier ($A_1$) into the control gain depending upon the displacement directional sense with respect to the said basic norm ($\theta=0$) and corrects this control gain in accordance with the mounting state of the said implement (2) to the rolling-control-mechanism (A); a preamp ($A_2$) which functions, while output voltage ($V_{|\theta|}$) of said converter (11) has given as input to the lift-angle detection sensor ($S_2$) so as to thereby generate as the output voltage ($V_3$) of this sensor ($S_2$) such voltage as voltage-divided in accordance with the lift angle ($\alpha$), to amplify the voltage at a predetermined gain; an operational section (12) which effects addition and subtraction, dealing with a voltage ($V_\alpha$), that is given as output from said amplifier ($A_2$) and that corresponds to the lift angle ($\alpha$), and the output voltage ($V_{|\theta|}$) from the said gain converter (11), and which converts same to a target voltage ($V_2$) of the cylinder length corresponding to the extension and contraction amount of the oilhydraulic cylinder (8); a preamp ($A_3$) which converts the output voltage of the said sensor ($S_3$) to a voltage ($V_l$) corresponding to the cylinder length to one and the same scale as the scale of the said target voltage ($V_2$); a group of comparators (14) which compare the same target voltage ($V_2$) with the detection voltage ($V_l$) and generate control signals for driving an electromagnetic valve (13) of the oilhydraulic cylinder (8); and a driver circuit (15) which receives as input thereto the output signals of the group of comparators (14) and which drives the electromagnetic valve (13); and thus it controls the extension and contraction amount of the oilhydraulic cylinder (8) so that the target voltage ($V_2$), as has so converted on the basis of the body slant angle ($\theta$) of the said sensor ($S_1$), and the detection voltage ($V_l$) of the sensor ($S_3$), as corresponds to the cylinder length, may come to be equal, thereby to maintain to be horizontal the posture of the said cultivation rotary (2), regardless of: the left-and-right slanting tilt of the tractor (1); the lift angle; as well as the mounting state.

As to the said preamp ($A_1$), same is constructed so as to convert the voltage ($V_1$), as is given as the output from the sensor ($S_1$), to the voltage ($V_\theta$) that is in proportion to the slant angle ($\theta$) with respect to the basic norm voltage ($V_s$) corresponding to the state of the body being horizontal ($\theta=0$).

Thus, the correspondence is respectively such that the body is rightwards uprising ($\theta>0$) in the case the output voltage ($V_\theta$) is larger than the said basic norm voltage ($V_s$), while the body is leftwards uprising ($\theta<0$) in the case smaller.

As to the said gain converter (11), same is constructed so as to function as a so-called absolute-value amplifier, with: a non-inverting amplifier section (16) which non-invertingly amplifies the output voltage ($V_\theta$) of the said preamp ($A_1$) in the range negative with respect to the basic norm voltage ($V_s$) ($V_\theta<V_s$) and of which the output voltage is 0V in the range positive thereto ($V_\theta \geq V_s$); an inverting amplifier section (17) which invertingly amplifies same in the range positive with respect to the basic norm voltage ($V_s$) ($V_\theta>V_s$) and of which the output voltage is 0V in the range negative thereto ($V_\theta \leq V_s$); an adder section (18) which composes the output ($V_{|-\theta|}$) of this inverting amplifier section (17) and the output ($V_{|+\theta|}$) of the said non-inverting amplifier section (16); and a comparator ($A_4$) which judges the relationship of the said voltage ($V_\theta$) with respect to the basic norm voltage as to whether larger or smaller, namely the directional sense of the body slant angle ($\theta$).

As to the said non-inverting amplifier section (16), provided therein are: two non-inverting amplifiers ($A_5$), ($A_6$), which are adapted to have the amplification ratios (gains) thereof made variable respectively in a plurality of steps by means of external signals; and an amplifier ($A_7$) which adds in a predetermined ratio the output of the said amplifier ($A_5$) to the said basic norm voltage ($V_s$) and which gives output as a correction voltage ($V_{\theta'}$) to the said operational section (12).

As to the said inverting amplifier section (17), provided therein are an inverting amplifier ($A_8$) and a non-inverting amplifier ($A_9$), which are adapted to have the gains thereof made variable respectively in a plurality of steps by means of external signals, similar to the said non-inverting amplifier section (16); and an amplifier ($A_{10}$) which subtracts in a predetermined ratio the output of the said amplifier ($A_8$) from the said basic norm voltage ($V_s$) and which gives output as a correction voltage ($V_{\theta''}$) to the said operational section (12).

Here, as to the respective gains $(K_1)$, $(K_2)$, $(K_3)$, $(K_4)$ of the said amplifiers $(A_5)$, $(A_6)$, $(A_7)$, $(A_8)$ which have their gains made possible variable; same are adapted to be set automatically in response to the combination status of: an implement-attaching-width selection switch $(SW_1)$ which selects in two steps the dimension of the said rear-end gap of the lower links (4), (4'); a switch $(SW_2)$ which selects in two steps of the attaching position, in the up-and-down direction, of the lower links (4), (4') with respect to the lift arms (3), (3') by so adjusting the connection position (B) between the lift rods (7), (7') and the lower links (4), (4'); and a switch $(SW_3)$ which selects in two steps the attaching position, in the fore-and-aft direction, of the lower links (4), (4') with respect to the lift arms (3), (3') by so adjusting the said connection position (B); thus adapted to be set automatically to become the gains as are in proper response to the basic norm posture of the said link mechanism (6), by means of decoders $(D_2)$, $(D_3)$, $(D_4)$, $(D_5)$ which receive signals from an encoder $(D_1)$ which converts the combination status of the said switches $(SW_1)$, $(SW_2)$, $(SW_3)$ into the logic signals.

By the way, as to the gain $(K_1 \times K_2)$ of the said non-inverting amplifier section (16) and the gain $(K_3 \times K_4)$ of the inverting amplifier section (17), same are made to be different gains, since on account of the linkage construction of the said three-point link mechanism (6), the control amounts necessary for controling the posture of the cultivation rotary (2) to be horizontal are different, depending upon the directional senses of the body slant angle $(\theta)$, even if in the case of one and the same detection angle.

As to the said adder section (18), provided therein are: an analog switch $(SW_4)$ which shifts over the output $(V_{|+\theta|})$ of the said non-inverting amplifier section (16) and the output $(V_{|-\theta|})$ of the inverting amplifier section (17), depending upon the output $(C_1)$ of the said comparator $(A_4)$; and an amplifier $(A_{11})$ serving as a buffer to receive the output of this switch $(SW_4)$; so it thus functions to convert the detection voltage $(V_\theta)$, which corresponds to the said slant angle $(\theta)$, into an absolute voltage $(V_{|\theta|})$, with the respectively different gains depending upon whether positive or negative.

As to the said operational section (12), provided therein are: an adder $(A_{12})$ which adds together the correction voltage $(V_\theta')$, that is given as output via the amplifier $(A_7)$ of the non-inverting amplifier section (16), and the detection voltage $(V_\alpha)$, that is given as output via the said amplifier $(A_2)$ and that corresponds to the lift angle $(\alpha)$; a subtractor $(A_{13})$ which subjects the correction voltage $(V_\theta'')$, that is given as output via the amplifier $(A_{10})$ of the non-inverting amplifier section (17), and the said detection voltage $(V_\alpha)$, to subtraction; an analog switch $(SW_5)$ which selectively gives, as output thereof, the output of this subtractor $(A_{13})$ or the said adder $(A_{12})$, depending upon the output $(C_1)$ of the said comparator $(A_4)$; and an amplifier $(A_{14})$ which receives the output of this analog switch $(SW_5)$; so it is thus constructed so as to give, as output, a target voltage $(V_z)$ corresponding to the extension and contraction amount of the said lift rod (7'), namely the extension and contraction amount (l) of the oilhydraulic cylinder (8), which corresponds to the said body slant angle $(\theta)$ and yet which has the gain thereof corrected in response to the link construction and further corrected in response to the lift angle $(\alpha)$.

As to the said group of comparators (14), provided therein are four comparators $(A_{15})$, $(A_{16})$, $(A_{17})$, $(A_{18})$; and same is constructed so as to compare the difference $(V_z - V_l)$ between the said target voltage $(V_z)$ and the detection voltage $(V_l)$ corresponding to the actual cylinder length as is detected by the sensor $(S_3)$ which is mounted on the oilhydraulic cylinder (8), with the respective reference voltages $(-\Delta)$, $(+\Delta)$, $(V_p)$, $(V_p')$, and to give, as outputs, corresponding control signals to the driver circuit (15) of the said electromagnetic valve (13).

As to the said comparators $(A_{15})$, $(A_{16})$, same is constructed so as respectively to give, as outputs, a signal $(C_2)$ of "H" level for the driving in the direction of contracting the oilhydraulic cylinder (8) in the case that the difference $(V_z - V_l)$, between the said target voltage $(V_z)$ and the detection voltage $(V_l)$, is smaller with respect to the basic norm voltage (OV) corresponding to the horizontal state, and a signal $(C_3)$ of "H" level for the driving in the direction of extending same in the case of larger.

By the way, the comparators $(A_{15})$, $(A_{16})$ are provided with insensitive range widths, around the said basic norm voltage (OV), respectively of $(-\Delta)$, $(+\Delta)$ for the malfunction prevention.

The said comparators $(A_{17})$, $(A_{18})$ compare the said difference voltage $(V_z - V_l)$ with the respective reference voltages $(V_p)$, $(V_p')$ (Supposed here with respect to them is the relationship of $V_p' < -\Delta < +\Delta < V_p$.) and generate logic signals $(C_4)$, $(C_5)$ of "H" level respectively in the case that this difference voltage $(V_z - V_l)$ is smaller than the reference voltage $(V_p)$, $(V_z - V_l < V_p)$, and in the case that same is larger than the reference voltage $(V_p')$, $(V_z - V_l > V_p)$. As to the signals $(C_4)$, $(C_5)$, the system is so constructed as to subject them to logical product (AND) treatment by means of an AND gate $(G_1)$, thus to give as the output thereof, to the said driver circuit (15), a signal $(C_6)$ of "H" level in the case that the following conditioning formula (i) is established:

$$V_p' < V_z - V_l < V_p \tag{i}$$

As to the said driver circuit (15), provided therein are: an oscillator (19) which oscillates pulses of a predetermined frequency: a NAND gate $(G_2)$ which gates the output of this oscillator (19) by means of the output $(C_6)$ of the said AND gate $(G_1)$; further NAND gates $(G_3)$, $(G_4)$ which take in, as one side inputs thereof, the output $(C_7)$ of this NAND gate $(G_2)$ and respectively take in, as the other side inputs thereof, the outputs $(C_2)$, $(C_3)$ of the said comparators $(A_{15})$, $(A_{16})$; and buffer circuits $(G_5)$, $(G_6)$ which receive the outputs of the gates $(G_3)$, $(G_4)$ and drive the said electromagnetic valve (13). Here, the system is so constructed as to respectively drive the electromagnetic valve (13) in such direction that the oilhydraulic cylinder (8) contracts with the said logic signal $(C_2)$ at "H", and in such direction that same extends with the logic signal $(C_3)$ at "H", and further so as to intermittently drive the electromagnetic valve (13), by means of the said oscillator (19), in the case that the said formula (i) is established.

The reason for effecting this intermittent driving is for rendering, at adjusting the posture of the cultivation rotary (2) by extending and contracting the oilhydraulic cylinder (8) in response to the said body slant angle $(\theta)$, the posture not to abruptly alter if and when the slant angle $(\theta)$ is within a range of being small enough, by means of retarding the extending and contracting speed of the cylinder (8).

By the way, (SW₆) is a switch for parallelling control which is for making the posture of the cultivation rotary (2) relative to the tractor (1) forcibly parallel, and thus when a control valve (not illustrated) of the oilhydraulic cylinder (9) for raising and lowering the lift arms has been shifted over into the raising position, same is then shifted over so as to give input, to the group of comparators (14), the reference voltage ($V_s$) in substitution for the target voltage ($V_z$) from the said operational section (12). Accordingly, when the machine body is turned round, in U-turn manner, at headlands or if and when maneuvers the cultivation rotary (2) is lifted up for non-working running travel, then the cultivation rotary (2) is automatically corrected into the basic norm posture which is parallel with respect to the tractor (1). Basides, (SW₇) is an auto/manual shiftover switch which is provided for making manually variable the posture (left-and-right slanting tilt) of the cultivation rotary (2) relative to the tractor (1), and (P) is a potentiometer as a means for so setting the slant angle.

As described above with reference to the embodiment, it is possible, with the work vehicle with the rolling-control mechanism, according to this invention, to effect the rolling control of high precision, even if the implement-attaching status of the three-point link mechanism (6) is changed by adjusting the link-connection positions of the lower links (4), (4′) in accordance with alteration of the kinds of the implement and the working type, or the like, by means of then effecting the control-gain alteration in response thereto. In other words, it has hereby resulted in enabling to widen the scope of the working kinds and working types, where the rolling control of high precision may be effected, and to heighten the versatility of the running machine body.

Since there further is provided the means for automatically shifting over the control gain of the rolling-control mechanism in response to the directional sense of the body-slant angle, the problem otherwise to occur in adjusting the posture (slanting tilt in the left-and-right direction) of the implement by means of torsional movement of the three-point link mechanism, in its entirety, by extending and contracting one lift rod thereof, namely the problem to the effect that the extending and contracting amounts (control amounts) of the rod are different, depending upon the slanting directional senses of the body with respect to the basic norm (horizontal state), even if in the case of one and the same slanting angle, can hereby also be solved.

In view further that there is also annexed a means which automatically corrects, in response to detection results of a sensor ($S_2$) to detect a lift angle ($\alpha$) of the said three-point link mechanism (6), the control gain with respect to the slant angle ($\theta$) as has been detected by means of the said sensor ($S_1$), it as well is possible, by the automatic correction of the control gain, to reduce the control error of such cause that on account of raising and lowering the three-point link mechanism (6) then there undergoes alteration the basic norm posture of said link mechanism (6) itself.

Various kinds of control errors deriving from the characteristics of the three-point link mechanism (6) are thus securely reduced by the control-gain corrections as described hereinbefore, thus to realize the rolling control of higher precision.

We claim:

1. A work vehicle which comprises
a vehicle body,
a ground engaging implement adjustably connected to said vehicle body by a three point link mechanism,
said three point link mechanism including lower links connected to said body and said ground engaging implement, said lower links being adjustable in width therebetween where they attach to said implement, lift arms and lift rods connected between said lift arms and said lower links and adjustable in a vertical direction for lifting said ground engaging implement,
a first sensor means (S1) on said vehicle body for detecting a right-and-left slant and a slant angle $\theta$ of said vehicle body,
a rolling control mechanism,
said rolling control mechanism adapted to adjust said ground engaging implement relative to ground by adjusting one of said lift rods in response to said slant angle $\theta$, and
said rolling control mechanism comprises means for shifting a control gain corresponding to said slant angle $\theta$ detected by said first sensor means (S1) to a different gain in response to adjustment of said lower links to a different width with respect to said ground engaging implement.

2. A work vehicle as set forth in claim 1 further comprising means for shifting said control gain corresponding to the slant angle $\theta$ detected by said first sensor means (S1), to a different gain in response to adjustment of said lift rods to a different attaching position in the fore-and-aft direction to and with respect to said lower links.

3. A work vehicle as set forth in claim 2 further comprising means for shifting said control gain corresponding to the slant angle $\theta$ detected by said first sensor means (S1), to a different gain in response to adjustment of said lift rods to a different attaching position in the up and down direction to and with respect to said lower links.

4. A work vehicle as set forth in claim 3 further comprising means for shifting said control gain corresponding to the slant angle $\theta$ detected by said first sensor means (S1), to a different gain in response to the right-and-left slant of the vehicle body detected by said first sensor means (S1).

5. A work vehicle as set forth in claim 3 further comprising a second sensor means for detecting a lift angle ($\alpha$) of said lift arms with respect to the vehicle body, and means for shifting said control gain corresponding to the slant angle ($\theta$) detected by said first sensor means (S1), to a different gain in response to said lift angle ($\alpha$) detected by said second sensor means (S2).

6. A work vehicle as set forth in claim 2 further comprising means for shifting said control gain corresponding to the slant angle $\theta$ detected by said first sensor means (S1), to a different gain in response to the right-and-left slant of the vehicle body detected by said first sensor means (S1).

7. A work vehicle as set forth in claim 2 further comprising a second sensor means for detecting a lift angle ($\alpha$) of said lift arms with respect to the vehicle body, and means for shifting said control gain corresponding to the slant angle ($\theta$) detected by said first sensor means (S1), to a different gain in response to said lift angle ($\alpha$) detected by said second sensor means (S2).

8. A work vehicle as set forth in claim 1 further comprising means for shifting said control gain corresponding to the slant angle $\theta$ detected by said first sensor means (S1), to a different gain in response to adjustment of said lift rods to a different attaching position in the up and down direction to and with respect to said lower links.

9. A work vehicle as set forth in claim 8 further comprising means for shifting said control gain corresponding to the slant angle $\theta$ detected by said first sensor means (S1), to a different gain in response to the right-and-left slant of the vehicle body detected by said first sensor means (S1).

10. A work vehicle as set forth in claim 8 further comprising a second sensor means for detecting a lift angle ($\alpha$) of said lift arms with respect to the vehicle body, and means for shifting said control gain corresponding to the slant angle ($\theta$) detected by said first sensor means (S1), to a different gain in response to said lift angle ($\alpha$) detected by said second sensor means (S2).

11. A work vehicle as set forth in claim 1 further comprising means for shifting said control gain corresponding to the slant angle $\theta$ detected by said first sensor means (S1), to a different gain in response to the right-and-left slant of the vehicle body detected by said first sensor means (S1).

12. A work vehicle as set forth in claim 1 further comprising a second sensor means for detecting a lift angle ($\alpha$) of said lift arms with respect to the vehicle body, and means for shifting said control gain corresponding to the slant angle ($\theta$) detected by said first sensor means (S1), to a different gain in response to said lift angle ($\alpha$) detected by said second sensor means (S2).

13. A work vehicle which comprises
a vehicle body,
a ground engaging implement adjustably connected to said vehicle body by a three point link mechanism,
said three point link mechanism including lower links connected to said body and said ground engaging implement, lift arms and lift rods connected between said lift arms and said lower links and adjustable in a vertical direction for lifting said ground engaging implement,
a first sensor means (S1) on said vertical body for detecting a right-and-left slant and a slant angle $\theta$ of said vehicle body,
a rolling control mechanism,
said rolling control mechanism adapted to adjust said ground engaging implement relative to ground by adjusting one of said lift rods in response to said slant angle $\theta$, and
said rolling control mechanism comprises means for shifting a control gain corresponding to said slant angle $\theta$ detected by said first sensor means (S1) to a different gain in response to adjustment of said lift rods to a different attaching position in the fore-and-aft direction to and with respect to said lower links.

14. A work vehicle as set forth in claim 13 further comprising means for shifting said control gain corresponding to the slant angle $\theta$ detected by said first sensor means (S1), to a different gain in response to adjustment of said lift rods to a different attaching position in the up and down direction to and with respect to said lower links.

15. A work vehicle as set forth in claim 14 further comprising means for shifting said control gain corresponding to the slant angle $\theta$ detected by said first sensor means (S1), to a different gain in response to the right-and-left slant of the vehicle body detected by said first sensor means (S1).

16. A work vehicle as set forth in claim 14 further comprising a second sensor means for detecting a lift angle ($\alpha$) of said lift arms with respect to the vehicle body, and means for shifting said control gain corresponding to the slant angle ($\theta$) detected by said first sensor means (S1), to a different gain in response to said lift angle ($\alpha$) detected by said second sensor means (S2).

17. A work vehicle as set forth in claim 13 further comprising means for shifting said control gain corresponding to the slant angle $\theta$ detected by said first sensor means (S1), to a different gain in response to the right-and-left slant of the vehicle body detected by said first sensor means (S1).

18. A work vehicle as set forth in claim 13 further comprising a second sensor means for detecting a lift angle ($\alpha$) of said lift arms with respect to the vehicle body, and means for shifting said control gain corresponding to the slant angle ($\theta$) detected by said first sensor means (S1), to a different gain in response to said lift angle ($\alpha$) detected by said second sensor means (S2).

19. A work vehicle which comprises
a vehicle body,
a ground engaging implement adjustably connected to said vehicle body by a three point link mechanism,
said three point link mechanism including lower links connected to said body and said ground engaging implement, lift arms and lift rods connected between said lift arms and said lower links and adjustable in a vertical direction for lifting said ground engaging implement,
a first sensor means (S1) on said vehicle body for detecting a right-and-left slant and a slant angle $\theta$ of said vehicle body,
a rolling control mechanism,
said rolling control mechanism adapted to adjust said ground engaging implement relative to ground by adjusting one of said lift rods in response to said slant angle $\theta$, and
said rolling control mechanism comprises means for shifting a control gain corresponding to said slant angle $\theta$ detected by said first sensor means (S1) to a different gain in response to adjustment of said lift rods to a different attaching position in the up and down direction to and with respect to said lower links.

20. A work vehicle as set forth in claim 19 further comprising means for shifting said control gain corresponding to the slant angle $\theta$ detected by said first sensor means (S1), to a different gain in response to the right-and-left slant of the vehicle body detected by said first sensor means (S1).

21. A work vehicle as set forth in claim 19 further comprising a second sensor means for detecting a lift angle ($\alpha$) of said lift arms with respect to the vehicle body, and means for shifting said control gain corresponding to the slant angle ($\theta$) detected by said first sensor means (S1), to a different gain in response to said lift angle ($\alpha$) detected by said second sensor means (S2).

* * * * *